June 3, 1958

A. M. MAROTH 2,836,985

TORQUE CONVERTING APPARATUS

Filed March 13, 1957

5 Sheets-Sheet 1

INVENTOR.
ARTHUR M. MAROTH
BY
BLAIR AND SPENCER
ATTORNEYS

June 3, 1958 A. M. MAROTH 2,836,985
TORQUE CONVERTING APPARATUS
Filed March 13, 1957 5 Sheets-Sheet 2

INVENTOR.
ARTHUR M. MAROTH
BY
BLAIR AND SPENCER
ATTORNEYS

June 3, 1958 — A. M. MAROTH — 2,836,985
TORQUE CONVERTING APPARATUS
Filed March 13, 1957 — 5 Sheets-Sheet 3

INVENTOR.
ARTHUR M. MAROTH
BY
BLAIR AND SPENCER
ATTORNEYS

June 3, 1958

A. M. MAROTH 2,836,985

TORQUE CONVERTING APPARATUS

Filed March 13, 1957

5 Sheets-Sheet 5

INVENTOR.
ARTHUR M. MAROTH
BY
BLAIR AND SPENCER
ATTORNEYS

United States Patent Office 2,836,985
Patented June 3, 1958

2,836,985

TORQUE CONVERTING APPARATUS

Arthur M. Maroth, Wilton, Conn.

Application March 13, 1957, Serial No. 645,743

6 Claims. (Cl. 74—424.8)

This invention relates to a transmission or torque converter construction. More particularly, the invention has to do with a screw and nut construction to convert efficiently rotary motion of the nut into linear motion of the screw.

One of the objects of this invention is to provide a torque converter construction which is simple and thoroughly reliable and practical in operation. Another object is to provide a torque converter of the above character which is markedly efficient in operation, thus reducing to a minimum the loss factor in power conversion. Another object is to provide a torque converter construction of the above character wherein a screw and nut construction is utilized to facilitate easy rotary motion combined with a highly efficient transfer factor to linear motion of the shaft. Another object of this invention is to provide a torque converter construction of the above character wherein certain friction-eliminating elements are combined with the usual screw and nut construction to achieve a ready and efficient transfer from rotary to linear force. Another object of this invention is to provide construction of the above character which is essentially simple and depends in a large part on readily available standard parts so that the manufacture thereof is easy and economical. Other objects will in part be obvious and in part pointed out hereinafter.

The invention accordingly comprises features of construction, combinations of elements, and arrangements of parts, which will be exemplified in the construction hereinafter set forth, and the scope of the invention will be indicated in the claims to follow.

Figure 1A:
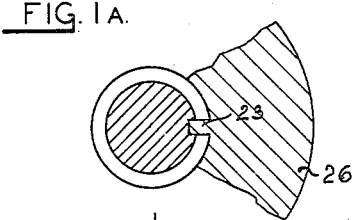
Figure 1:
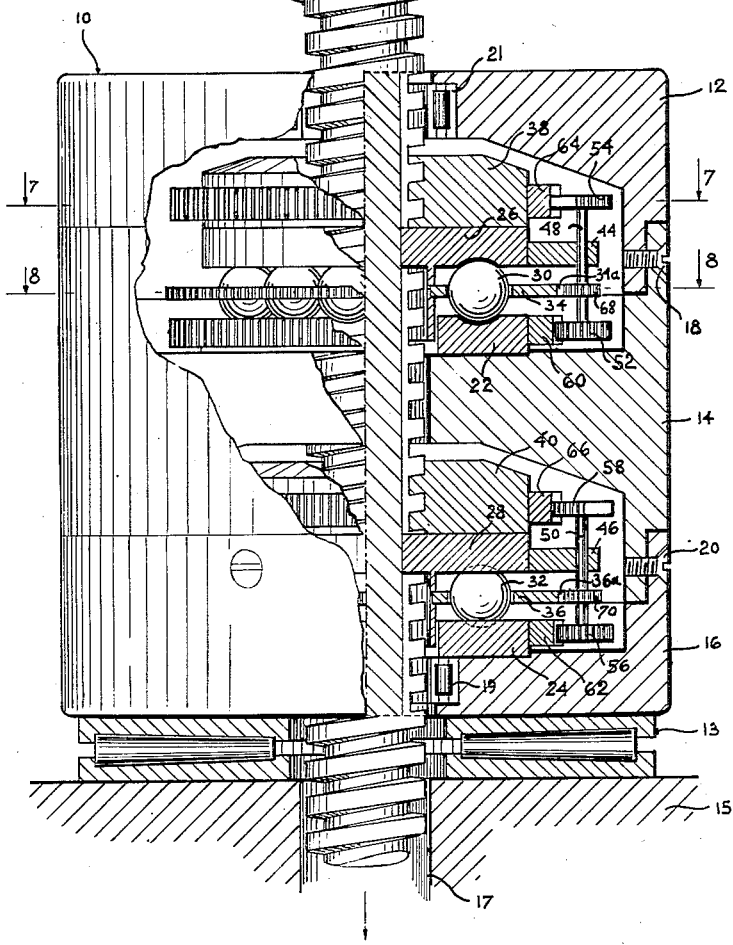
Figure 2:
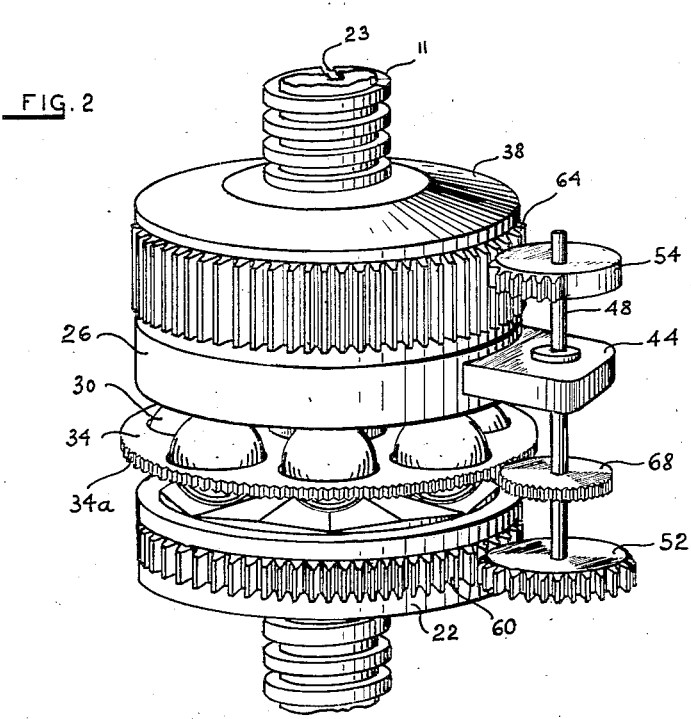
Figure 3:
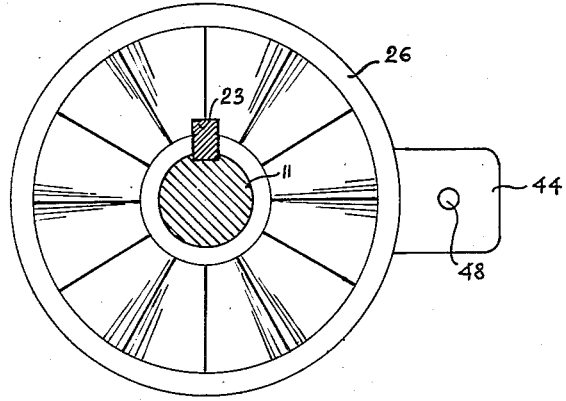
Figure 4:
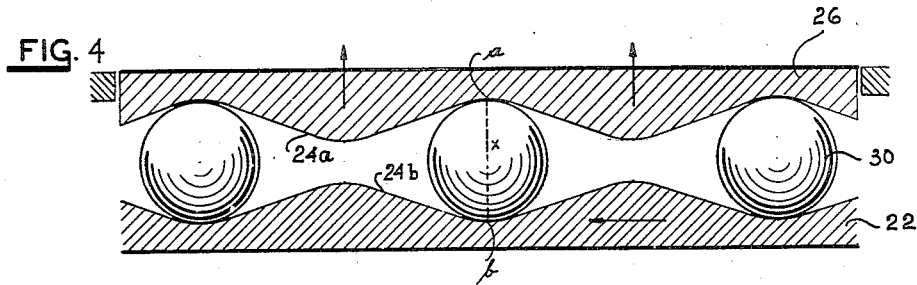
Figure 5:
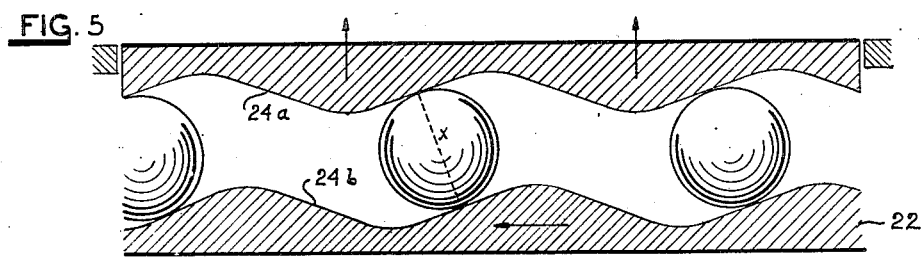
Figure 6:
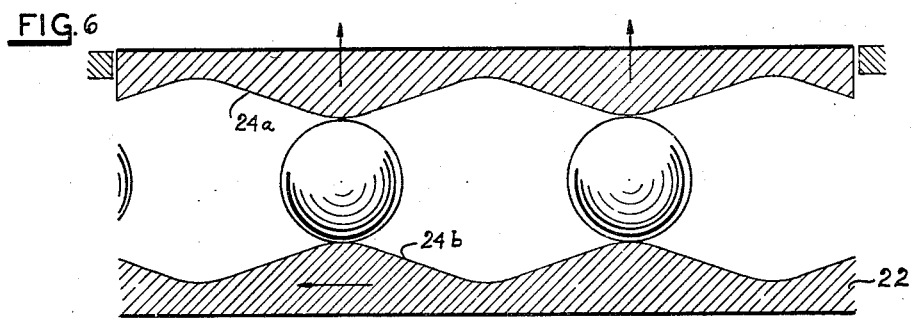
Figure 7:
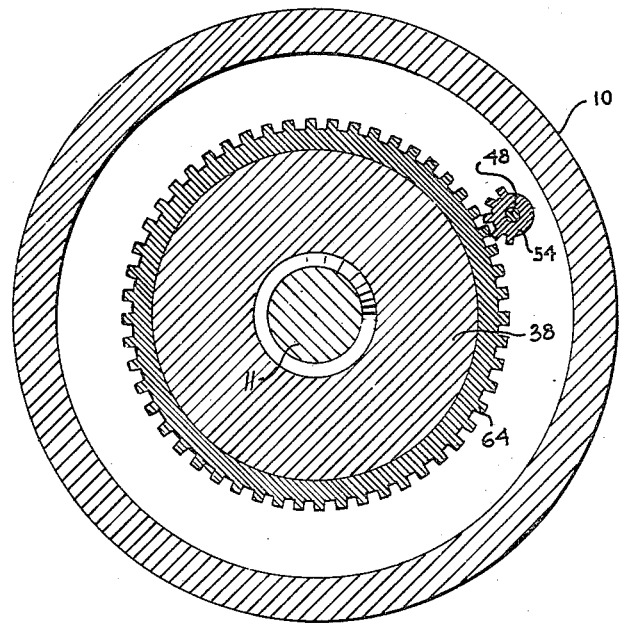
Figure 8:
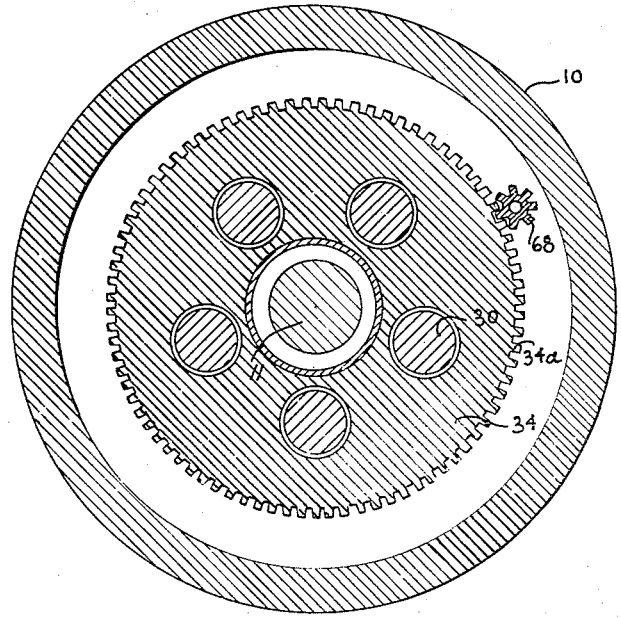
Figure 9:
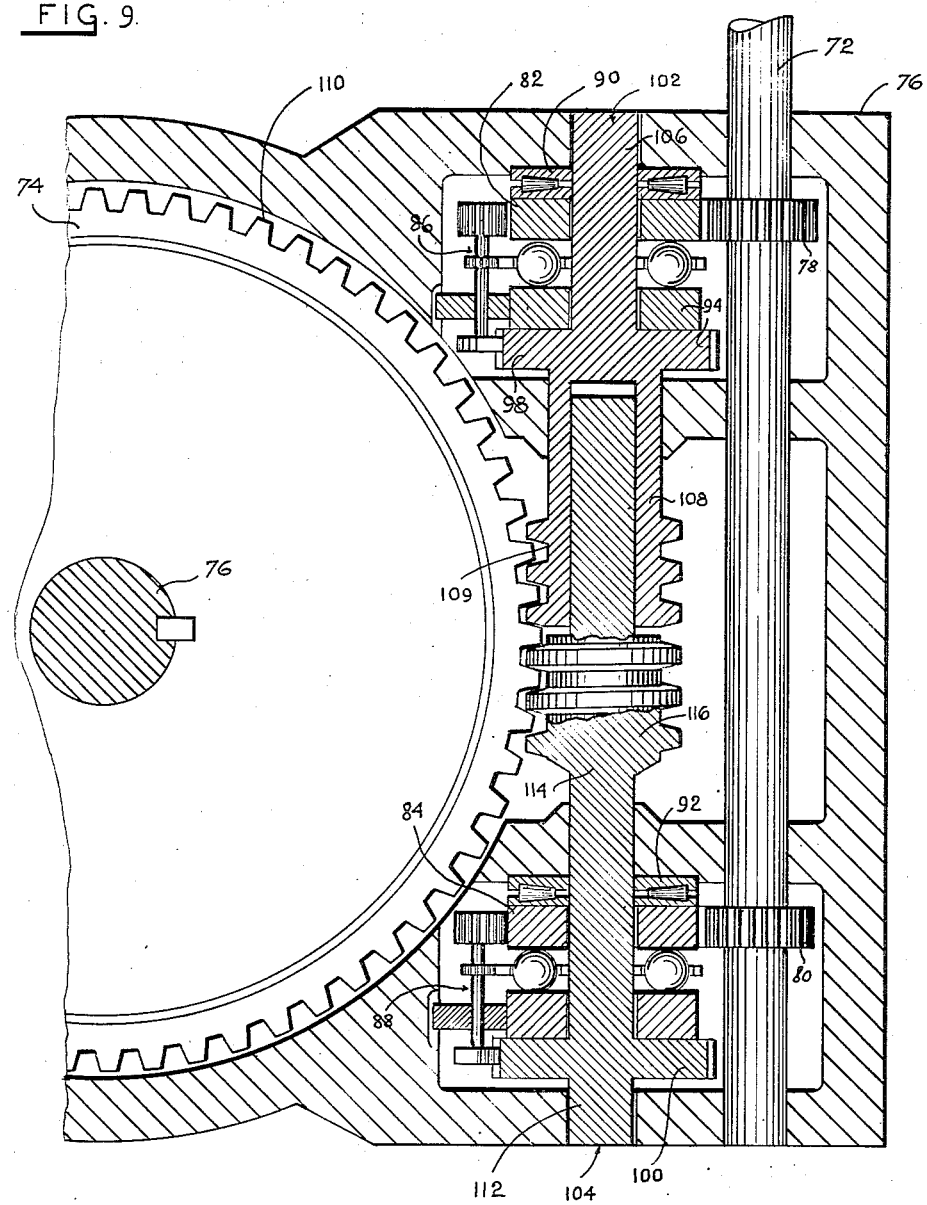

For a fuller understanding of the nature and objects of the invention, reference should be had to the following detailed description taken in connection with the accompanying drawings, in which:

Figure 1 is a front elevation, partially in section, of my screw and nut torque converter construction, Figure 1A is a fragmentary sectional view of the shaft and a part keyed thereto, Figure 2 is a perspective view of the torque converter construction shown in Figure 1, Figure 3 is a horizontal sectional view taken along the line 3—3 of Figure 1, Figure 4 is a fragmentary developed sectional view of the ball and cam plate torque converter construction in its starting position, Figure 5 is a view similar to Figure 4 of the same parts at an intermediate stage in the operation of the converter construction, Figure 6 is a view similar to Figures 4 and 5 showing the mechanism as the operation progresses to a final phase of the operative sequence, Figure 7 is a horizontal sectional view taken along the line 7—7 of Figure 1, Figure 8 is a horizontal sectional view taken along the line 8—8 of Figure 1, and Figure 9 is a vertical sectional view, partially schematic and partially in section, showing another embodiment of this invention.

Similar reference characters refer to similar parts throughout the several views of the drawings.

Generally speaking, the mechanism comprises a nut member generally indicated at 10 consisting of three segments 12, 14 and 16 and associated mechanism secured together by screws 18 and 20, all as can be seen in Figure 1. Segments 12, 14 and 16 are concentric with but not threaded on a screw shaft generally indicated at 11; however, the nut member as a unitary mechanism is threaded on the shaft by way of mechanism associated therewith to be presently described. Nut member 10 rests on roller bearings 13 supported on a base 15 and shaft 11 extended through a hole 17 therein. Furthermore, nut member 10 is rotatably supported on shaft 11 by roller bearings 19 and 21. The construction to be described is designed to move shaft 11 upwardly against a downward force indicated by the arrows in Figure 1. Stationary ring cam plates 26 and 28 are disposed immediately above rotary cam plates 22 and 24, respectively, and interposed between these cam plates are sets of balls 30 and 32, respectively. Further, cam plates 22 and 24 are connected to segments 14 and 16, respectively, of nut member 10 by suitable interfitting parts (not shown) thereby assuring that these parts will always move in unison. Cam plates 26 and 28 are keyed to shaft 11 by way of a key way generally indicated at 23 in Figure 1A. Thus, cam plates 26 and 28 are free to slide longitudinally with respect to screw shaft 11 in a manner to be presently described. Thus as can be understood from Figures 1–6, balls 30 and 32 are disposed to roll between the cam surfaces of these pairs of cam plates; more particularly, balls 30, held in a retainer ring 34, are disposed between rotary cam plate 22 and stationary cam plate 26, while balls 32 are held in a retainer ring 36 between cam plates 24 and 28.

Nut members 38 and 40 are disposed immediately above cam plates 26 and 28, respectively, and are threaded on screw shaft 11 which is adapted to be driven upwardly against the downward force as indicated by the arrows in Figure 1 by the camming action to be described. Figures 4, 5 and 6 indicate a sequence of movements between cam plates 22 and 26 during rotation of nut 10, and cam plates 24 and 28 are identical in construction but oppositely disposed so that the highs on the cam surfaces of one pair of cam plates oppose each other when the lows in the other set of cam plates are opposite each other. More particularly, when cam plates 22 and 26 are in the position shown in Figure 4, cam plates 24 and 28 will occupy the position of Figure 6 and in the operation to be presently described, it is assumed that these parts are in such positions.

Referring to Figure 1, stationary cam plates 26 and 28 have extensions 44 and 46 extending radially therefrom, extension 44 being better seen in Figure 2. Shafts 48 and 50 are rotatably mounted therein, shaft 48 carrying pinions 52 and 54 and shaft 50 carrying similarly disposed pinions 56 and 58. Rotary cam plates 22 and 24 carry gear rings 60 and 62, respectively, keyed thereto and meshing with pinions 52 and 56 while nut members 38 and 40 carry substantially similar gear rings 64 and 66 meshing with pinions 54 and 58. Consequently, rotation of cam plates 22 and 24 rotates pinions 52 and 56, and by way of shafts 48 and 50, pinions 54 and 58. This rotation causes corresponding movement of gear rings 64 and 66 to rotate nut members 38 and 40. As can be seen in Figure 7, pinion 54 has teeth on less than 180° of its surface, and it is positioned on shaft 48 to be out of mesh with gear ring 64 at the start of the operation to be described.

It will now be understood that clockwise movement of nut 10 as viewed in Figure 1 moves rotary cam plates 22 and 24 correspondingly or to the left as viewed in Figures 4–6. Considering for the moment the action of cam plates 22 and 26 and associated parts, during movement from the position shown in Figure 4 to the position shown in Figure 6, the highs on the cam plates move from opposing positions to positions opposing balls 30. This causes vertical movement of nut member 38 which is connected to shaft 11 and, consequently, the shaft moves upwardly. As previously noted cam plates 24 and 28 were in the opposite or Figure 6 position at the start of this operation. Thus the toothed portion of pinion 58 was in mesh with gear ring 66. Accordingly, rotation of the nut member 10 rotates gear ring 62 and through pinions 56 and 58 nut member 40 is threaded to and rotates about shaft 11. Therefore, nut member 40 is in substantial engagement with cam plate 28 as the shaft moves upwardly and will remain so as nut member 40 rotates on shaft 11. However, when balls 32 reach the low or Figure 4 position, balls 30 will have reached the high or Figure 6 position and the action will reverse. More particularly, at this instant pinion 58 will demesh from gear ring 66 and pinion 54 will mesh with gear ring 64. Continued rotation of nut member 10 now causes cam plate 24 and associated mechanism to move shaft 11 upwardly while nut member 38 rotates, because the toothed part of pinion 54 has now meshed with gear ring 64. And so the action continues as long as the nut member is rotated, the load alternately shifting from one set of cam plates to the other during continuous operation and the slack being taken up by the nut members 38 and 40 alternately.

It is to be noted that during operation balls 30 and 32 must roll between the cam plates. Thus balls 30 rotate between cam plates 22 and 26 and balls 32 likewise rotate between cam plates 24 and 28. Because cam plates 26 and 28 are stationary with respect to cam plates 22 and 24, the linear movements of the centers of the ball is half the distance travelled by the plates 22 and 24 with respect to plates 26 and 28, respectively. Accordingly, to provide for proper movement of the retainer rings 34 and 36, the peripheral faces 34a and 36a thereon mesh with pinions 68 and 70, respectively, fixed to shafts 48 and 50. These pinions 68 and 70 are so proportioned as to drive rings 34 and 36 at half the speed of gear rings 60 and 62.

The cam surfaces of cam plates 22, 24, 26 and 28 are substantially identical, and accordingly a description of the surfaces of cam plates 22 and 24 as represented in Figures 4, 5 and 6 will suffice for both sets of cam plates. Thus, surfaces 24a and 24b as shown in Figures 4, 5 and 6 are exactly complementary. In other words, the points of contact between the balls and cam surfaces 24a and 24b are at all times in parallel relationship. Stated in another way, a line $x$ (Figures 4, 5 and 6) drawn diametrically from contact points $a$ and $b$ on cam surfaces 24a and 24b will at all times be normal to the respective surfaces being contacted. Because of this parallel relationship, there can be no sliding action between the balls and the cam surfaces. Consequently, all motion is confined to rotary motion of the balls as they roll over the respective cam surfaces. Because there is no such sliding motion, friction is reduced to a minimum, and the cam plates will always be maintained in proper complementary relationship, thereby to effectively convert the rotary motion of the nut into vertical motion of the upper cam plates 24 and 28.

During operation nut members 38 and 40 must continuously move relative to ring cam plates 26 and 28. In order to avoid frictional drag therebetween, the teeth on pinion 54 cover less than 180° of the periphery thereof. Accordingly, pinions 54 and 58 do not mesh with gear rings 64 and 66 at the transition point, i. e., when one set of the balls 30 and 32 is in the high position (Figures 4–6) and the other in the low position. Rather the meshing of these gear parts takes place momentarily thereafter so that downward movement of the nut members with respect to the shaft 11 does not precisely correspond to similar movement of cam plates 22 and 24 which are following the balls as described above.

It will now be apparent that I have provided apparatus for transferring the rotary motion of nut member 10 into the linear motion of shaft 11 in a markedly efficient manner. It will be noted that this transfer is concentrated entirely in the rotary-cam action of the balls 30 and 32 between the cam plates 22 and 26, and 24 and 28, respectively. This rolling action which constantly cams shaft 11 upwardly during rotation of the nut 10 therefore provides an effective transfer of these forces with an absolute minimum of friction. It should be further noted that the pinion-drive connection between the cam plates 22 and 24 and the nut members 38 and 40 only operates in a resetting capacity, i. e., when the nut members are moving downwardly with respect to shaft 11 as viewed in Figure 1 and hence are under no load. Thus this pinion-drive inner connection takes no part in the actual torque transfer; otherwise considerable frictional drag would be added.

In Figure 9 there is shown another embodiment of my invention in which the rotary motion of a shaft 72 is converted into rotary motion of a gear wheel 74 keyed to a shaft 76. Thus, shaft 72 is rotatably mounted in a casing generally indicated at 76, and a pair of pinions 78 and 80 fixed thereto mesh with the toothed periphery of cam plates 82 and 84. Cam plates 82 and 84 are part of cam-ball torque converter mechanisms generally indicated at 86 and 88. These mechanisms are identical with those previously described with reference to Figure 1, and they are rotatably mounted in casing 76 by way of roller bearings 90 and 92. Cam plates 94 and 96 of mechanisms 86 and 88, respectively, engage flanges 98 and 100 of reciprocating members generally indicated at 102 and 104, respectively. Thus, member 102 includes a shaft portion 106 reciprocably mounted in casing 76 and a socket portion 108 having grooves 109 formed therein meshing with the teeth 110 on gear wheels 76. Member 104 includes a shaft portion 112 reciprocably mounted in casing 76 and an extension 114 fitting within socket portion 108 and having an enlarged section 116 with grooves 118 also meshing with teeth 110.

Accordingly, upon rotation of shaft 72, cam plates 82 and 84 are rotated and through the action of cam-ball mechanisms 86 and 88 previously described, reciprocating members 102 and 104 are alternately urged downwardly as viewed in Figure 9, thereby continuously rotating gear wheel 74. It will be understood that roller bearings similar to bearings 90 and 92 could be interposed between flanges 98 and 100 and the casing 76, in which event gear wheel 74 could be driven in either direction according to the direction of rotation of drive shaft 72.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. In a torque converter for translating rotary movement into linear movement, in combination, a threaded shaft, a housing member rotatably mounted on said shaft, mechanism for imparting linear motion to said shaft upon rotation of said housing member including a first and a second cam plate interposed between said housing member and said shaft and having opposing wavy cam surfaces of similar contour, said first cam plate engaging and connected to said housing member to rotate therewith about said shaft and said second cam plate being slidably keyed to said shaft to move longitudinally only with respect thereto, a plurality of balls interposed between said cam surfaces, said surfaces being shaped so that the opposing zones of contact with said balls will at all times be parallel, a cage for said balls interposed between said cam plates, a nut threaded to said shaft opposite said second cam plate, means forming a rotary connection between said first cam plate, said cage, and said nut and adapted to intermittently rotate said nut in a direction to move it toward said second cam plate when said cam plates are moving toward each other, whereby said cam plates intermittently move apart to impart linear movement to said shaft and move toward each other when said nut rotates to move toward said second cam plate.

2. The combination defined in claim 1 in which there are two pairs of said cam plates and associated structure as defined in claim 1, said pairs being substantially 180° out of phase so that the highs of one pair oppose each other when the lows of the other pair are in opposition to impart continuous linear movement to said shaft.

3. The combination defined in claim 1 in which said rotary connection includes a gear meshing with teeth on the periphery of said first cam plate and a gear segment of substantially 180° meshing with teeth on the periphery of said nut to thereby rotate said nut about said shaft intermittently.

4. The combination defined in claim 3 in which said rotary connection includes an additional gear meshing with teeth on said cage to thereby rotate said cage continuously.

5. The combination defined in claim 1 in which said balls and cam surfaces are so shaped that diameter lines through said balls to the points of contact with said surfaces will at all times be normal thereto.

6. The combination defined in claim 1 in which the relative dimensions of said cam surfaces and said balls are such that the linear movement of the centers of said balls is half the distance of the relative movement of said cam plates.

References Cited in the file of this patent

UNITED STATES PATENTS

| | | |
|---|---|---|
| 1,585,140 | Erban | May 18, 1926 |
| 2,127,588 | Erban | Aug. 23, 1938 |
| 2,151,094 | Florentine | Mar. 21, 1939 |
| 2,278,775 | Florentine | Apr. 7, 1942 |
| 2,583,775 | Hyde | June 29, 1952 |

FOREIGN PATENTS

| | | |
|---|---|---|
| 800,260 | France | Apr. 27, 1936 |